(12) United States Patent
Kato

(10) Patent No.: US 7,916,603 B2
(45) Date of Patent: Mar. 29, 2011

(54) PHASE-CHANGE OPTICAL INFORMATION RECORDING MEDIUM AND METHOD FOR RECORDING AND RECORDING APPARATUS USING THE SAME

(75) Inventor: Masaki Kato, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 430 days.

(21) Appl. No.: 12/065,086

(22) PCT Filed: Aug. 25, 2006

(86) PCT No.: PCT/JP2006/317289
§ 371 (c)(1),
(2), (4) Date: Feb. 27, 2008

(87) PCT Pub. No.: WO2007/026853
PCT Pub. Date: Mar. 8, 2007

(65) Prior Publication Data
US 2009/0129223 A1    May 21, 2009

(30) Foreign Application Priority Data

Aug. 31, 2005    (JP) .................................. 2005-251859

(51) Int. Cl.
*G11B 20/10*    (2006.01)
(52) U.S. Cl. .................................. 369/59.12; 369/47.51
(58) Field of Classification Search .................. None
See application file for complete search history.

(56) References Cited

U.S. PATENT DOCUMENTS

| 7,512,050 | B2 * | 3/2009 | Yokoi et al. ................ 369/59.12 |
| 2006/0062125 | A1 | 3/2006 | Horie et al. |
| 2006/0120262 | A1 | 6/2006 | Kiyono |

FOREIGN PATENT DOCUMENTS

| EP | 1 369 850 A1 | 12/2003 |
| EP | 1 569 208 A1 | 8/2005 |
| EP | 1 684 269 A1 | 7/2006 |
| JP | 2004-171642 A | 6/2004 |
| JP | 2005-4800 | 1/2005 |
| JP | 2005-149610 | 6/2005 |
| JP | 2006-40493 | 2/2006 |
| TW | 200511306 | 3/2005 |
| WO | WO 2005/013267 A1 | 2/2005 |
| WO | WO 2005/048247 * | 5/2005 |

OTHER PUBLICATIONS

ECMA-371, Data Interchange on 120 mm and 80 mm Optical Disk using +RW HS Format—Capacity: 4,7 and 1,46 Gbytes per Side (Recording speed 8X) 1st Edition, Dec. 2005.
ECMA-349, Data Interchange on 120 mm and 80 mm Optical Disk using +R Format—Capacity: 4,7 and 1,46 Gbytes per Side (Recording speed up to 16X) 3rd Edition, Dec. 2005.

* cited by examiner

*Primary Examiner* — Paul Huber
(74) *Attorney, Agent, or Firm* — Dickstein Shapiro LLP

(57) ABSTRACT

Provided by the present invention is a method for recording on a phase-change optical information recording medium including irradiating "m" number of heating pulse with power Pw and "m" number of cooling pulse with power Pc when recording a mark of n~Tw time length, and changing a preset value of at least any one of "m"th heating pulse THm and "m"th cooling pulse TCm when "n" is voluntary during test recording and information recording when setting an optimum write power, wherein "m" is a natural number, "n" is a natural number, Tw is a channel bit length and Pw is larger than Pc, and n=2m+1 is true when "n" is an odd number and n=2m is true when "n" is an even number.

7 Claims, 3 Drawing Sheets

PHASE-CHANGE OPTICAL INFORMATION RECORDING MEDIUM AND METHOD FOR RECORDING AND RECORDING APPARATUS USING THE SAME

This application is a 371 of PCT/JP2006/317289, filed Aug. 25, 2006.

TECHNICAL FIELD

The present invention relates to a phase-change optical information recording medium which uses a phase-change material as a recording material, on which at least any one of recording, reproducing, erasing and rewriting is possible by means of intensity modulation of irradiated light as typified by DVD-RAM, DVD-RW, DVD+RW and CD-RW, and a method for recording on the phase-change optical information recording medium and a recording apparatus.

BACKGROUND ART

The demand for improvement of write speed on recordable optical discs is increasing for responding to larger capacity of digital information of recent years. Particularly the demand for higher speed is increasing for DVD media which have already been in widespread use. Although rewritable DVD-R/+R media applicable for up to 16× speed (with scan speed of 55.8 m/s and channel bit rate of 419 Mbps) have already been made commercially available, there has been a delay in speeding up of rewritable media and 6× speed (with scan speed of 20.94 m/s and channel bit rate of 157 Mbps) is the maximum for DVD-RW and 8× speed (with scan speed of 27.9 m/s and channel bit rate of 209 Mbps) is the maximum for DVD+RW. The main reason for this is the simultaneous pursuit of speeding up and reliability.

In general, rewritable optical discs are based on the reversible changes of recording layers using phase-change materials. Examples of rewritable phase-change optical discs include CD-RW (Compact Disc ReWritable), DVD-RW, DVD+RW, DVD-RAM (Digital Versatile Disc ReWritable), HD DVD-RW (High Density DVD ReWritable) and BD-RE (Blu-ray Disc ReWritable).

In particular, it is possible to perform recording, erasing and rewriting of information on these discs by forming amorphous marks in the crystalline phase by heat history of the recording layer material and crystallizing amorphous marks. The greatest benefit of this technique is that the phase changes can take place reversibly between crystalline and amorphous phases only by heat history and compatibility with read-only apparatuses is easily obtained because it does not require particular kind of optical systems.

Since it is necessary to control heat history, that is, quenching and gradual cooling, the maximum recording speed depends largely on the crystallization speed of recording layer materials. In other words, by using recording layer materials of high crystallization speed in order to correspond to high-speed recording, "gradual cooling" becomes possible even with a heat history in which "quenching" usually takes place. However, the recording layer materials of high crystallization speed tend to have low stability with time. The stability with time of the material in which high-speed phase changes occur with low energy is affected in the range between room temperature to operative temperature (approximately 60° C.).

It is generally known that the properties are degraded particularly when recording or overwriting was performed after long-term storage after non-recording or recording. The method in which recording tests are conducted after storing unrecorded discs is generally called "shelf", and a method in which overwriting is performed after storing recorded discs is generally called "archival shelf".

For the above reasons, standards relating to the archival shelf, "Overwrite Stability", which assure reliability over time, are added to the standards for DVD+RW, 8× speed disc.

These archival-overwrites depend largely on the recording layer materials as stated above; however, it is possible to be improved by method for recording. In particular, it is possible to be improved by setting recording strategy (intensity modulation of light irradiated to the discs during recording) or by setting write power (intensity of light irradiated to the discs during recording) to its optimal.

Write power is usually determined by OPC (Optimum Power Control), the optimum write power control. This is a method in which test recordings are performed by drives on the test recording area (it is called "PCA": "Power Calibration Area" or "Drive Test Area") disposed on the disc to calculate the optimum write power.

When OPC is performed on a disc after long-term storage or shelf tests, however, it is difficult to set the calculated write power including a number of overwriting as the optimum condition because properties of PCA have also been changed. Moreover, there may be differences in powers calculated in the recorded area where time has passed since recording and unrecorded area where time has passed without recording.

The prior art literatures relating to the present invention are as described in the following.

The Nonpatent Literature 1 is US standards for CD-RW, in which 2T strategy applicable for high-speed recording is specified. Moreover, γ method for setting optimum write power is also described. However, there is no description for asymmetry in consideration of the shortest space right after the shortest mark used in the present invention.

In Nonpatent Literature 2, the "2T strategy", which is used in the present invention, is specified in detail. The optical information recording medium, to which the method for recording of the present invention is applied, is assumed to be based on the standards. The γ method is described as OPC (Optimum Power Control).

In Nonpatent Literature 3, a method using beta (β), which is similar to asymmetry, is described as a procedure for OPC. However, there is no description relating to the use of different strategies between data portion and OPC portion.

Furthermore, a method and an apparatus for recording information in which test recording is performed by changing parameters of recording strategy with two types of patterns which differ from each other, and reproducing signal after test recording is evaluated in order to set optimum recording parameters are disclosed in Patent Literature 1. The similar method is also employed in the present invention, however, the method in Patent Literature 1 differs from that of the present invention because comparison using patterns only of 2mT (where "m" is a natural number) and patterns of (2m−1)T is the primary concern.

[Patent Literature 1] Japanese Patent Application Laid-Open (JP-A) No. 2005-04800
[Nonpatent Literature 1] "Recordable Compact Disc Systems part III", volume 3, version 1.1 (commonly called as "Orange Book")
[Nonpatent Literature 2] "DVD+RW 4.7 Gbytes Basic Format Specification part 1", volume 2, version 1.0 (Standards for DVD+RW applicable for 8× speed recording and rewriting)
[Nonpatent Literature 3] ECMA-349 [Data Interchange on 120 mm and 80 mm Optical Disk using +RFormat-Capacity:

4, 7 and 1, 46 Gbytes per Side (Recording speed up to 8×
speed)] (Standards for DVD+R)

DISCLOSURE OF INVENTION

An object of the present invention is to provide a phase-change optical information recording medium which is capable of improving recording reliability after long-term storage by setting an optimum recording condition at the time of recording after long-term storage, and a method for recording on the phase-change optical information recording medium and a recording apparatus.

The measures to solve above problems are as follow.

<1> A method for recording on a phase-change optical information recording medium including irradiating "m" number of heating pulse with power Pw and "m" number of cooling pulse with power Pc when recording a mark of n×Tw time length, and changing a preset value of at least any one of "m"th heating pulse THm and "m"th cooling pulse TCm when "n" is voluntary during test recording and information recording when setting an optimum write power, wherein "m" is a natural number, "n" is a natural number, Tw is a channel bit length and Pw is larger than Pc, and n=2m+1 is true when "n" is an odd number, n=2m is true when "n" is an even number, "i" is a natural number equal to or less than "m", THi is a length of "i"th heating pulse and TCi is a length of "i"th cooling pulse.

<2> The method for recording on the phase-change optical information recording medium as stated in above <1>, wherein the preset value of at least any one of THm and TCm is changed only when "n" is an odd number of 3 or more during test recording and information recording.

<3> The method for recording on the phase-change optical information recording medium as stated in above <2>, wherein the preset value of THm during test recording is set larger than the THm during information recording or the preset value of TCm during test recording is set smaller than the TCm during information recording.

<4> The method for recording on the phase-change optical information recording medium as stated in any one of above <1> to <3>, wherein the optimum write power is set by evaluating asymmetry of reproducing signal recorded for test recording.

<5> A phase-change optical information recording medium including a test recording area for setting an optimum write power, and a preset value of at least any one of THm and TCm used for test recording for setting an optimum write power, wherein the preset value is recorded on the phase-change optical information recording medium during manufacture, and the phase-change optical information recording medium is used for a method for recording on a phase-change optical information recording medium as stated in any one of above <1> to <4>.

<6> The phase-change optical information recording medium as stated in above <5>, wherein an optimum asymmetry value is recorded on the phase-change optical information recording medium during manufacture.

<7> A recording apparatus of phase-change optical information recording medium used for a method for recording on a phase-change optical information recording medium as stated in any one of above <1> to <4>.

BEST MODE FOR CARRYING OUT THE INVENTION

The method for recording of the present invention is intended to perform recording on a phase-change optical information recording medium using phase-change materials which are typified by rewritable optical discs.

Recording Strategy

Recording of information is performed by forming marks of length nT ("n" is a natural number) or between marks (spaces) to the channel clock T by light irradiation and scanning. The recording system of information such as this is one of PWM (pulse width modulation) and it is the modulation method for recording of information generally used on optical discs. Examples include EFM [Eight to Fourteen Modulation, RLL (2, 10)] employed for CD or EFM+ [one of EFM, RLL (2,10)] employed for DVD.

These marks are microscopic regions of amorphous phase formed in the recording layer of crystalline phase. An optical contrast can be formed by using materials in which optical constant at recording/reproducing wavelengths changes between crystalline and amorphous phase. Moreover, since phase changes between crystalline phase and amorphous phase of the phase-change materials are reversible changes, rewrite is possible.

Figure 2:
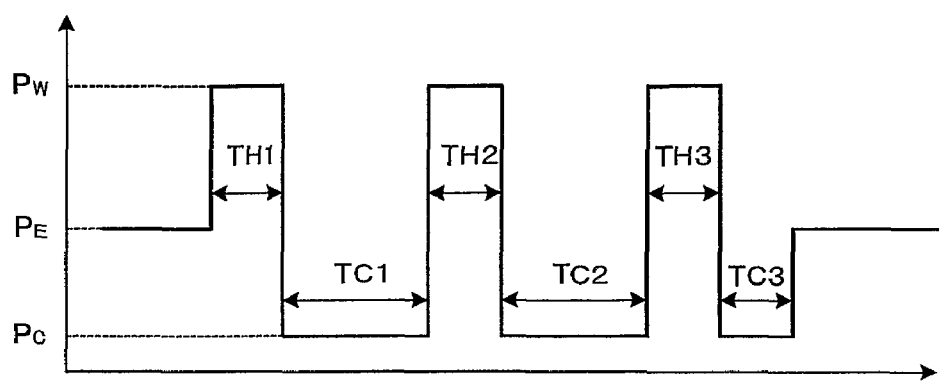
FIG. 2 is a diagram showing a multipulse strategy.

In order to induce phase changes between amorphous phase and crystalline phase, intensity-modulated laser beam is irradiated and scanned. The pattern of intensity modulation of irradiated light is called "recording strategy". The recording strategy uses a multipulse strategy as shown in FIG. 2. With the multipulse strategy, recording layers are melted by repeated irradiation of heating pulses with an irradiation power Pw and cooling pulses with an irradiation power Pc, and then amorphousized by quenching to form a mark. Furthermore, an erase power Pe is irradiated with continuous wave (no modulation in intensity of light) to gradually cool or retain the recording layer at a crystallization temperature or more for predetermined amount of time, thereby crystallizing the amorphous marks to be erased. It is necessary for each irradiated power to satisfy the relation: Pw>Pe>Pc.

Further, number of heating pulse and cooling pulse "m" ("m" is a natural number) is selected depending on the length of recorded mark "nT". The relation becomes m=(n−1) with discs recorded with relatively slow speed such as CD-RW (1× speed to 4× speed, 4× speed to 10× speed) or DVD+RW (1× speed to 4× speed). In other words, marks of different lengths may be recorded precisely by increasing each heating pulse and cooling pulse by 1 pulse for forming marks which are 1 T longer. And it is known that the emission cycle of the pulse closely corresponds to the channel bit length Tw at the time of recording. Therefore, when recording at 8× speed, Tw becomes T/8, however, it is impossible for the laser response time to follow because of high recording speed.

With that, it is necessary to use a strategy in which "m" becomes n/2 when "n" is an even number and "m" becomes (n−1)/2 when "n" is an odd number for high-speed disc. The emission cycle of the pulse becomes approximately 2 Tw with the above settings, making the laser response time to be able to follow even for recording at high speed.

The strategy is called "2T strategy" and is being employed for high-speed recording discs such as CD-RW of 24× speed or more or DVD+RW of 8× speed.

Figure 1:
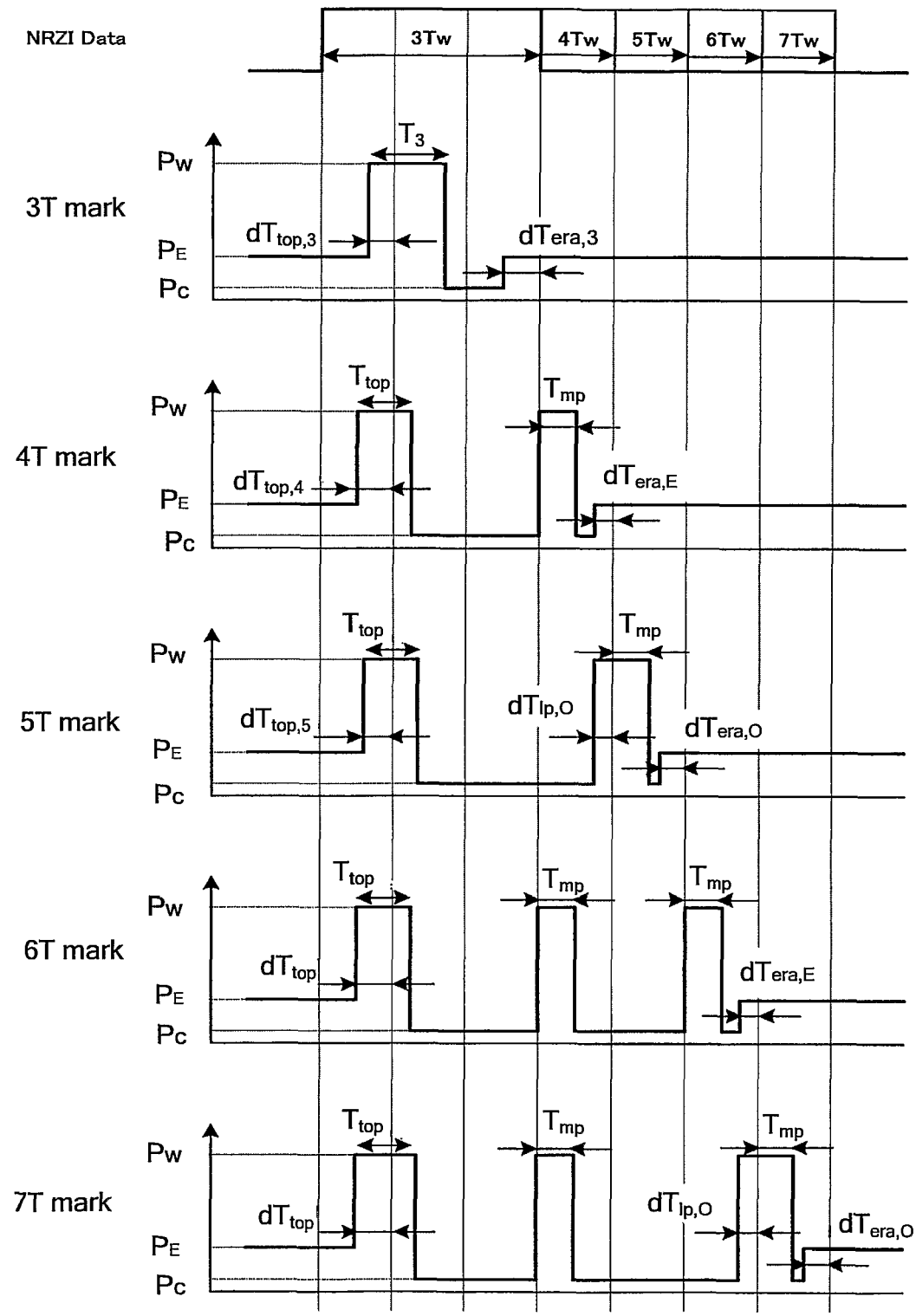
FIG. 1 is a diagram showing a pattern of actual 2T strategy.

The 2T strategy is also used in the method for recording of the present invention. The actual pattern of 2T strategy is shown in FIG. 1. This is the 2T strategy employed for DVD+RW of 8× speed.

The strategy is basically composed of the multipulse of $T_{mp}$ length which emits at 2 Tw cycle. However, when "n" is an odd number, mark length is adjusted by setting the emission cycle only of the last pulse at approximately 3T, and by shifting the rising time by $dT_{1p,\,O}$ and shifting the cooling pulse length (=1 Tw$-dT_{1p,\,O}-dT_{era,\,O}$) to the one with "n" being an even number. By employing such procedure, when optimum recording condition is shifted, odd number marks are deformed and jitters tend to get degraded because of the shift in write power or variation in optical recording media.

Moreover, the strategy makes high-speed recording possible even though optimization is more difficult compared to the strategy of m=n-1 because of the large number of parameters which need to be set. Especially the adjustment of the lengths of the last heating pulse and cooling pulse (that is, "m"th heating pulse and cooling pulse) THm and TCm is extremely important, and if these parameters are not optimal, storage stability and possible number of overwriting are degraded.

OPC (Optimum Power Control)

It is necessary to set the optimum recording condition in order to perform stable recording on optical recording media. OPC is a method in which recording is performed on PCA, which is an OPC area reserved in the optical recording medium in advance, while changing the write power Pw as needed, the test recorded area is reproduced and an indicator, signal S (Pw) is calculated as a function of write power to set the optimum write power using an arbitrary calculation method.

The existing methods are usable as OPC methods and examples include γ method employed for CD-RW or DVD+RW, β method employed for CD-R or DVD+R and linear fit method employed for BD-RE. Any of these may be used and they may be used in combination. Particularly, β method, which is similar to the evaluation of asymmetry, is preferable because it is an indicator which relates to jitter.

The method for recording of the present invention is characterized by differentiating between strategy for OPC test recording and strategy for information recording.

In general, the same pattern is used in the strategy for OPC and the strategy for data recording. The existing example for differentiating between strategy for OPC and strategy for data recording include when the test recording area (PCA) is located in the inner periphery of the medium in form of disc.

With the disc of 120 mm diameter in general, rotational frequency is limited to approximately 10,000 rpm or less. This is because of the performance of spindle motor employed in the drive and disc damage caused by sympathetic vibration of the disc. Currently, DVD±R discs of up to 16× speed (with scan speed of 55.8 m/s) have been made practically usable, however, the disc speed is limited to approximately 6× speed in diameter of 24 mm which is an inner periphery portion of the disc due to the above limitation on rotational frequency. Therefore, test recording for OPC must be performed at 6× speed when PCA is located in the inner periphery (in diameter of 23 mm, and the like) on the disc. In this case, a strategy which is different than the strategy for information recording is used accordingly because strategies suitable for 6× speed differ from the strategies suitable for 16× speed. However, when recording is performed on information area at 6× speed, the same strategy is employed. In contrast, the present invention is characterized by applying different strategies even when the recording speed is the same.

The 2T strategy is used for strategies for information recording and OPC in the present invention. In other words, "m" numbers of heating pulse and cooling pulse, which satisfy the relation of n=2m or n=2m+1, are used (FIGS. 1. and 2) when recording a mark of n×Tw length (where "n" is a natural number and Tw is a channel bit length during recording). With the length (irradiation time) of "i"th heating pulse (where "i" is a natural number equal to or less than "m") being THi and the length (irradiation time) of "i"th cooling pulse (where "i" is a natural number equal to or less than "m") being TCi, one or both of the length (irradiation time) of "m"th (last) heating pulse THm and the length (irradiation time) of "m"th (last) cooling pulse TCm when "n" is a particular value need to be changed between OPC recording and information recording.

The combinations of "n" with which strategies are changed may be employed randomly and preferred conditions are the following:

| <Condition 1> | |
|---|---|
| n = 3: | strategy is changed, |
| n ≠ 3: | strategy is not changed, |
| <Condition 2> | |
| n = odd number: | strategy is changed, |
| n = even number: | strategy is not changed, |
| <Condition 3> | |
| n = odd number other than 3: | strategy is not changed, |
| n = 3 or even number: | strategy is changed. |

These conditions are based on EFM+, modulation method for DVD. In other words, because it is RLL (2, 10), the shortest mark length is n=3. As shown in FIG. 1, only when n=3 (3T mark), a particular kind of pattern is formed because recording is performed with a pair of heating pulse and cooling pulse. Furthermore, it is the least flexible because adjustment of mark length and mark width is done only by a pair of heating pulse and cooling pulse. Therefore, marks are most likely to be affected by the condition (right after manufacture, after storage at high temperature, after non-recording/recording) of recording layers of the optical recording medium. The strategy with which jitter is lowered (mark length becomes stable) and the strategy with which OPC becomes stable (reflectance difference, that is, signal amplitude becomes stable) differ from each other at most for the shortest mark. This is because when the mark is satisfactorily large relative to the reproducing beam diameter, it is hardly affected by the shapes of the mark.

The above conditions 2 and 3 are differentiated by even and odd numbers.

As shown in FIG. 1, when "n" is an even number, the emission cycle of heating pulse is limited to approximately 2 Tw. On the other hand, when "n" is an odd number, only the emission cycle of the last heating pulse is approximately 3 Tw. In other words, the cycle of the last pulse portion differs between even number and odd number. In this case, the optimum amplitude is obtained near the optimum write power, however, when write power was changed during test recording for OPC, the variation in amplitude relative to the write power differs between n=odd number and n=even number.

Therefore, in order to solve above problem, it is preferable to change the length of the last pulse between OPC and recording when n=odd number.

Further, the settings as the next equation is preferable when n=odd number.

THm (during OPC)>THm (during information recording)
TCm (during OPC)<TCm (during information recording)

By this, the difference in power dependency of the amplitude between n=odd number and n=even number can be lessened in an area where the write power is off the optimum value, thereby improving accuracy for OPC.

The variable range is optimized depending on the recording speed or properties of the disc, but it is not preferable to be changed significantly, and preferable range is approximately 1% to 20% and more preferably 1% to 10%.

The information related to at least any one of THm and TCm during OPC and recording may be recorded during manufacture of optical recording media. These values may be directly recorded or values obtained uniquely by calculation may be recorded. It becomes possible to set optimum recording conditions for OPC and information recording by reading the information during OPC and before recording operation in the recording apparatus, enabling to improve recording reliability. Existing techniques may be used for recording information on the optical recording medium during manufacture, and production cost may be reduced by having information in grooves or prepits because the information is transferred to the substrate during substrate molding. Such method includes a known method in which landprepit of DVD-RW or ADIP (address in pregroove) of DVD+RW are used and specific examples include Physical information of ADIP employed for DVD+RW.

It is necessary to set property values for calculating the optimum write power during OPC operation. For example, γ (P) is calculated from the next equation where modulation degree as a function of write power P is m (P) and is compared to the constant number γ target which is set for each CD-RW and DVD+RW disc.

$$\gamma(P)=dm(P)/dP\times(P/m)$$

And Po which satisfies γ (Po)=γ target is obtained as the optimum write power. This method is generally called γ OPC method.

The β method employed for CD-R or DVD+R is also nearly the same method except property value is β (a parameter similar to asymmetry).

The optimum write power can be obtained by using these existing methods, however, it is preferable to use asymmetry in the present invention.

The asymmetry in the case of DVD+RW is defined as the following equation.

$$\text{Definition: }[(I14H+I14L-I3H-I3L)/2]/(I14H-I14L)$$

The definitions (contents) of each parameter in the above equation are as follows:
I14H: signal level of 14T space;
I14L: signal level of 14T mark;
I3H: signal level of 3T space;
I3L: signal level of 3T mark.

At least one of THm and TCm is changed for recording performed by the method for recording in the present invention and the asymmetry brings the most noticeable effect. This is because the asymmetry becomes the most effective property by the change in the length of the shortest mark.

Furthermore, it is possible for the optimum asymmetry value to be recorded during manufacture of the optical recording medium as similar to the case when at least one of THm and TCm is recorded. This makes it possible to improve setting reliability of the optimum write power for the optical recording medium.

It becomes possible to set optimum recording conditions in the recording apparatus by reading the information during OPC and prior to recording on the optical recording medium.

By the present invention, a method for recording on the phase-change optical information recording medium in which simultaneous pursuit of reliability of recording information and accuracy of OPC is possible by using a strategy in which signal amplitude is stable during test recording and a recording strategy in which jitter is appropriate during information recording can be provided.

Also provided by the present invention is a phase-change optical information recording medium in which optimum information necessary for settings of write power is recorded in advance, thereby enabling to perform stable recording.

And by the present invention, a recording apparatus which can perform recording of high reliability on the phase-change optical information recording medium is provided.

EXAMPLE

The invention will be explained in detail referring to Examples and Comparative Examples below and the following Examples and Comparative Examples should not be construed as limiting the scope of this invention.

Example 1

A recording test was conducted using a DVD+RW disc applicable for 8× speed. An evaluation system for DVD+RW, ODU1000 by Pulstec Industrial Co., Ltd. was used as a recording apparatus.

Specification of the optical pickup was as follows:
Wavelength: 659 nm;
NA: 0.65;
Maximum emission power: 55 mW.

The use of the recording apparatus makes it possible to perform recording on random places of a disc with a voluntary setting of strategy and power, and at the same time, to evaluate recording signals.

A recording strategy based on the standards for DVD-RW applicable for 8× speed (FIG. 1) was used. In doing so, two types of recording strategies, WS1 and WS2 were used (Table 1). WS1 and WS2 are changed lengths of the last cooling pulse ("m"th) of the marks when "n" is an odd number. The values of the last cooling pulse length TCm are also shown in Table 1.

A recording was performed using the above strategy under the condition corresponding to 6× speed DVD as stated below.
Scan speed: 20.9 m/s
Channel clock: 6.37 nm
Write power Pw: 20 mW to 40 mW
Ratio of erase power to write power: Pe/Pw=0.19
Cooling power Pc: 0.1 mW
Number of overwriting: 10 times (DOW10)

Measurements before storage were performed after recording at each write power, and the medium was put in a constant-temperature bath of the following environment.
Temperature: 80° C.
Relative Humidity: 85%
Storage time: 100 hours After storage, overwriting was performed once (DOW1) under the same condition as the recording condition before storage. The measurement results of asymmetry and jitter for each strategy before and after storage test are shown in FIG. 3 and FIG. 4 respectively.

Meanwhile, jitter and asymmetry were measured by means of the same apparatus as used for recording, ODU1000 by Pulstec Industrial Co., Ltd. according to ECMA-337, chapter 27, the international standard of recordable DVD media.

For the recording performed with WS1, jitters before and after the storage test were appropriate, and they satisfied the standard value 9% in the wide range of 26 mW to 36 mW. On the other hand, for the recording performed with WS2, the absolute values of jitter were higher than that of recording with WS1 and they did not satisfy the standard value, 9% or less in DOW1 performed after the storage test.

Figure 3:
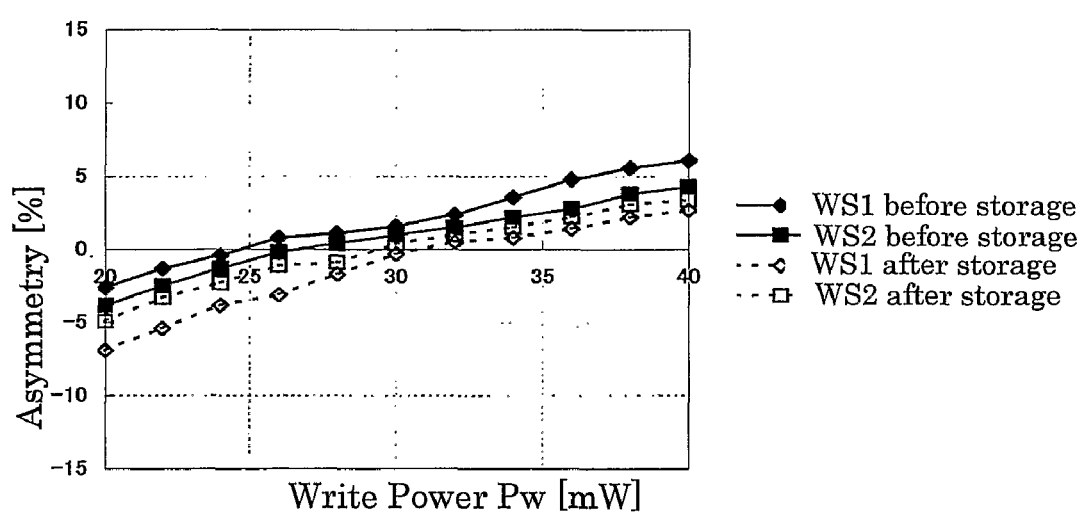
FIG. 3 is a diagram showing the measurement result of asymmetry values for each strategy before and after the storage test conducted in Example 1.
Figure 4:
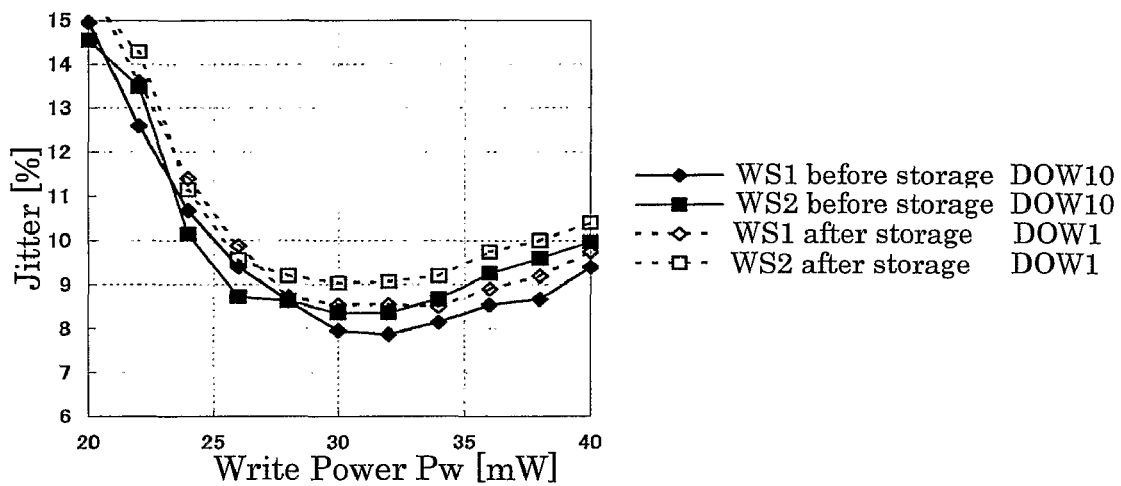
FIG. 4 is a diagram showing the measurement result of jitter value for each strategy before and after the storage test conducted in Example 1.

At the same time, it turns out that the fluctuation in asymmetry values before and after the storage test was larger for the recording performed with WS1 as shown in FIG. 3.

The OPC for determining optimum power is assumed to be performed with asymmetry as an indicator. In this case, if the optimum asymmetry value is 2%, the optimum write power before the storage test is 32 mW for WS1. However, when OPC is performed again after the storage test and the optimum write power is set at an asymmetry of 2%, it shows that the optimum write power becomes 40 mW, thereby significantly degrading jitter values.

On the other hand, fluctuation in asymmetry values is small for WS2 before and after the storage test. Therefore, when OPC was performed with asymmetry as an indicator, if the optimum value of asymmetry is 2%, the optimum write power before the storage test is 32 mW and the optimum write power after the storage test is 34 mW, resulting in fluctuation of 10% or less.

Consequently, it turns out that the simultaneous pursuit of improvements in OPC accuracy and recording properties is possible by the use of WS2 for calculating the optimum power for OPC test recording and by the use of WS1 for information recording.

Figure 5:
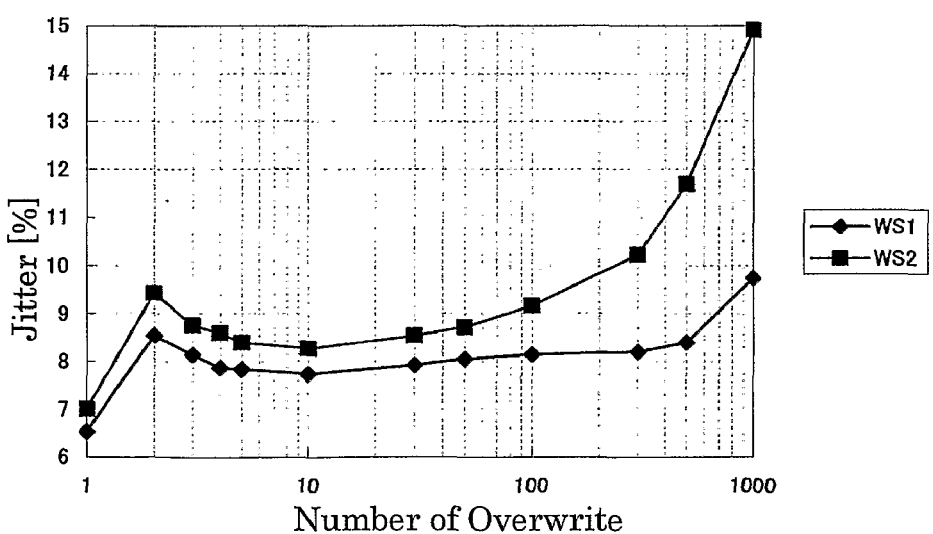
FIG. 5 is a diagram showing the result of the overwriting test conducted with the strategy used in Example 1.

The results of the overwriting test conducted with the strategy used as above are shown in FIG. 5.

From FIG. 5, it turns out that jitter values for WS2 are rapidly increased with the increase in number of overwriting. Consequently, it indicates that there is a possibility of error occurrence with a number of recording when information recording is performed with WS2 of high OPC accuracy.

Example 2

The test was conducted by the same procedure as for Example 1. However, parameters of the strategy were set as shown in Table 2. That is, the strategy WS1 was set for information recording as similar to Example 1 whereas the strategy WS3 was set for OPC test recording. The width of the last heating pulse with "n" being an odd number was set 0.063 Tw longer for the WS3. As a result, approximately the same effect was confirmed as in Example 1.

Example 3

The test was conducted by the same procedure as for Example 1 on two kinds of discs. These discs had the same physical characteristics but different Physical Information which were recorded in ADIP according to ECMA-330 as follows:
Sample A: Physical Information Byte 255=00 h
Sample B: Physical Information Byte 255=01 h The recording apparatus, ODU1000 was programmed to detect Byte 255 in Physical Information and to set write strategy according to Byte 255 value. When Byte 255 in Physical Information was 00 h, WS1 as shown in Table 1 was applied for both OPC and data recording. When Byte 255 in Physical Information was 01 h, WS2 as shown in Table 1 was applied only for OPC whereas WS1 as shown in Table 1 was applied for data recording.

Because the sample B had information indicating to change TCm for OPC, valid write power was determined after storage test. Therefore, reliability of disc was improved with prerecorded information.

TABLE 1

| Parameter | WS1 | WS2 |
|---|---|---|
| $T_{mp}$ | 0.563 | 0.563 |
| $T_3$ | 1.000 | 1.000 |
| $T_{top}$ | 0.688 | 0.688 |
| $dT_{top}$ | 0.125 | 0.125 |
| $dT_{top,5}$ | 0.125 | 0.125 |
| $dT_{top,4}$ | 0.125 | 0.125 |
| $dT_{top,3}$ | 0.125 | 0.125 |
| $dT_{lp,O}$ | 0.000 | 0.000 |
| $dT_{era,O}$ | 0.313 | 0.375 |
| $dT_{era,E}$ | 0.313 | 0.313 |
| $dT_{era,3}$ | 0.500 | 0.563 |
| THm (n = 3) | 1.000 | 1.000 |
| THm (n = odd number) | 0.563 | 0.563 |
| THm (n = even number) | 0.563 | 0.563 |
| TCm (n = 3) | 0.625 | 0.563 |
| TCm (n = odd number) | 0.125 | 0.063 |
| TCm (n = even number) | 0.125 | 0.125 |

Unit: Tw

TABLE 2

| Parameter | WS1 | WS3 |
|---|---|---|
| $T_{mp}$ | 0.563 | 0.563 |
| $T_3$ | 1.000 | 1.063 |
| $T_{top}$ | 0.688 | 0.688 |
| $dT_{top}$ | 0.125 | 0.125 |
| $dT_{top,5}$ | 0.125 | 0.125 |
| $dT_{top,4}$ | 0.125 | 0.125 |
| $dT_{top,3}$ | 0.125 | 0.125 |
| $dT_{lp,O}$ | 0.000 | 0.063 |
| $dT_{era,O}$ | 0.313 | 0.313 |
| $dT_{era,E}$ | 0.313 | 0.313 |
| $dT_{era,3}$ | 0.500 | 0.438 |
| THm (n = 3) | 1.000 | 1.063 |
| THm (n = odd number) | 0.563 | 0.625 |
| THm (n = even number) | 0.563 | 0.563 |
| TCm (n = 3) | 0.625 | 0.625 |
| TCm (n = odd number) | 0.125 | 0.125 |
| TCm (n = even number) | 0.125 | 0.125 |

Unit: Tw

Meanings of abbreviation in Tables 1 and 2 are as shown below:
T3 pulse of T3 length;
Tmp pulse of Tmp length;
Ttop length of first pulse;
dTtop shift amount in rising time of the first pulse when recording a mark of 6T or more;
dTtop, 3 shift amount in rising time of the first pulse when 3T mark is recorded;
dTtop, 4 shift amount in rising time of the first pulse when 4T mark is recorded;
dTtop, 5 shift amount in rising time of the first pulse when 5T mark is recorded;
dTera, 3 shift amount in rising time of the cooling pulse when 3T mark is recorded;

dTera, E shift amount in rising time of the cooling pulse when a mark of an even number T is recorded;

dTera, O shift amount in rising time of the cooling pulse when a mark of an odd number T is recorded;

dT1p, O shift amount in rising time of the last pulse when a mark of an odd number T is recorded.

The invention claimed is:

1. A method for recording user information, comprising:

providing a phase-change optical information recording medium having information recorded thereon representing (1) a first preset value of at least one of "m"th heating pulse THm and "m"th cooling pulse TCm, for setting an optimum write power during test recording and (2) a second preset value of at least one of "m"th heating pulse THm and "m"th cooling pulse TCm for recording said user information, said second preset value being different than said first preset value; and recording a mark of n×Tw time length on said phase-change optical information recording medium by irradiating "m" number of heating pulses with power Pw and "m" number of cooling pulses with power Pc, and wherein "m" is a natural number, "n" is a natural number, Tw is a channel bit length and Pw is larger than Pc, and wherein n=2m+1 is true when "n" is an odd number, n=2m is true when "n" is an even number, "i" is a natural number equal to or less than "m", THi is a length of "i"th heating pulse and TCi is a length of "i"th cooling pulse.

2. The method according to claim 1, wherein the second preset value of at least one of THm and TCm is used only when "n" is an odd number of 3 or more.

3. The method according to claim 2, wherein a preset value of THm for setting said optimum write power during test recording is larger than a preset value of THm for recording said user information, or a preset value of TCm for setting said optimum write power during test recording is smaller than a preset value of TCm for recording said user information.

4. The method according to claim 1, wherein the optimum write power is set by evaluating asymmetry of reproducing signal recorded for test recording.

5. A phase-change optical information recording medium, comprising:

a test recording area for setting an optimum write power, and a first preset value of at least one of THm and TCm used for test recording for setting an optimum write power, and a second preset value of at least one of THm and TCm for recording user information, said second preset value being different than said first preset value, wherein the first and second preset values are recorded on the phase-change optical information recording medium during manufacture, and the phase-change optical information recording medium is used for a method for recording on a phase-change optical information recording medium comprising:

irradiating "m" number of heating pulses with power Pw and "m" number of cooling pulses with power Pc when recording a mark of n×Tw time length; and selectively using one of said first and second preset values during said test recording and said user information recording, respectively, wherein "m" is a natural number, "n" is a natural number, Tw is a channel bit length and Pw is larger than Pc, and wherein n=2m+1 is true when "n" is an odd number, n=2m is true when "n" is an even number, "i" is a natural number equal to or less than "m", THi is a length of "i" th heating pulse and TCi is a length of "i" th cooling pulse.

6. The phase-change optical information recording medium according to claim 5, wherein an optimum asymmetry value is recorded on the phase-change optical information recording medium during manufacture.

7. A recording apparatus used for a method for recording comprising:

providing a phase-change optical information recording medium having information recorded thereon representing (1) a first preset value of at least one of "m"th heeding Pulse THm and "m"th cooling pulse TCm, for setting an optimum write power during test recording and (2) a second preset value of at least one "m"th heating pulse THm and "m"th cooling pulse for recording said user information, said second preset value being different than said first preset value; and recording a mark of n×Tw time length on said phase-change optical information recording medium by irradiating "m" number of heating pulses with power Pw and "m" number of cooling pulses with power Pc, and wherein "m" is a natural number, "n" is a natural number, Tw is a channel bit length and Pw is larger than Pc, and wherein n=2m +1 is true when "n" is an odd number, n=2m is true when "n" is an even number, "i" is a natural number equal to or less than "m", THi is a length of "i"th heating pulse and TCi is a length of "i"th cooling pulse.

* * * * *